United States Patent [19]
Sadow

[11] Patent Number: 5,890,570
[45] Date of Patent: *Apr. 6, 1999

[54] WHEELED CARRY-ON CASE

[75] Inventor: Bernard David Sadow, Chappaqua, N.Y.

[73] Assignee: Ourigger, Inc., Chappaqua, N.Y.

[ * ] Notice: The term of this patent shall not extend beyond the expiration date of Pat. No. 5,564,538.

[21] Appl. No.: 683,622

[22] Filed: Jul. 17, 1996

Related U.S. Application Data

[63] Continuation-in-part of Ser. No. 397,613, Mar. 2, 1995, Pat. No. 5,564,538.

[51] Int. Cl.⁶ .............................. A45C 5/14; A45C 13/26
[52] U.S. Cl. ......................... 190/18 A; 190/39; 190/115; 280/37
[58] Field of Search .................................. 190/18 A, 115, 190/39; 16/115; 280/37, 655, 655.1, 47.315

[56] References Cited

U.S. PATENT DOCUMENTS

| | | | |
|---|---|---|---|
| 3,606,372 | 9/1971 | Browning | 190/115 |
| 4,261,447 | 4/1981 | Arias et al. | 190/18 A |
| 4,759,431 | 7/1988 | King et al. | 190/18 A |
| 4,982,820 | 1/1991 | Scott | 190/18 A |
| 5,197,579 | 3/1993 | Bieber et al. | 190/18 A |
| 5,228,546 | 7/1993 | Chang et al. | 190/18 A |
| 5,230,408 | 7/1993 | Sadow | 190/18 A |
| 5,339,934 | 8/1994 | Liang | 190/18 A |
| 5,351,792 | 10/1994 | Cohen | 190/18 A |
| 5,377,795 | 1/1995 | Berman | 190/18 A |
| 5,407,039 | 4/1995 | Alper et al. | 190/18 A |
| 5,511,806 | 4/1996 | McNair | 280/47.2 |
| 5,564,538 | 10/1996 | Sadow | 190/115 X |
| 5,573,089 | 11/1996 | Liang | 190/115 X |

FOREIGN PATENT DOCUMENTS

| | | | |
|---|---|---|---|
| 0005879 | 12/1979 | European Pat. Off. | 190/18 A |
| 2409720 | 7/1979 | France | 190/18 A |
| 2005520 | 9/1971 | Germany | 190/18 A |
| 3636064 | 4/1988 | Germany | 190/115 |
| 587630 | 5/1977 | Switzerland | 190/18 A |
| 693373 | 7/1953 | United Kingdom | 190/18 A |

*Primary Examiner*—Sue A. Weaver
*Attorney, Agent, or Firm*—Abelman, Frayne & Schwab

[57] ABSTRACT

A wheeled carry-on case has a rigid base and a guide extending perpendicular to said base in which a retractable handle is slidably received, the base having wheels positioned along the major dimension of the base at one edge thereof, and having wheels positioned at spaced positions along at least one of the minor dimensions of the base, thus permitting the case to be wheeled over a ground surface in a first direction perpendicular to a front and rear of the case, and also, in a second direction extending parallel to the front and rear wall of the case. A single retractable handle is operably positioned to guide the movement in either of the first or second directions.

10 Claims, 3 Drawing Sheets

WHEELED CARRY-ON CASE

RELATED APPLICATIONS

This is a Continuation-In-Part of Ser. No. 08/397,613, Filed Mar. 2, 1995, now U.S. Pat. No. 5,564,538.

FIELD OF THE INVENTION

This invention relates to improvements in articles of wheeled luggage such as a carry-on case. Such cases commonly are used by air travelers in the transportation of personal property to the aircraft, the case after boarding of the passenger being stored in an over head luggage compartment.

BACKGROUND OF THE INVENTION

Wheeled articles of luggage such as carry-on cases are well known in the art. Those cases incorporate a retractable handle, that when extended can be employed for guiding the case or towing of the case, the case being provided with ground-engaging wheels to permit it to be traversed over a ground surface.

Such cases incorporate a retractable handle positioned adjacent that face of the carry-on case that is provided with the ground-engaging wheels.

However, once the passenger has boarded an aircraft and is towing the carry-on case, the passenger must then re-orient the case 90° to permit the case to be carried up the passenger aisle of the aircraft prior to its storage in a storage compartment of the aircraft.

OBJECT OF THE INVENTION

It is an object of this invention to provide a carry-on case, which is capable of wheeled movement in direction perpendicular to the front and rear face of the carry-on case, and, which also is capable of wheeled movement in directions transverse thereto in a plane substantially parallel to the front and rear face of the carry-on case.

Another object of this invention is to provide such a wheeled article of luggage in which a single retractable handle may be used to guide the article of luggage either of its two directions of movement.

A further object of this invention is to provide such an article of luggage in which the manually graspable portion of the handle may be rotated 90° to guide movement in the selected direction.

Additionally, it is an object of this invention to provide a wheeled carry-on case having two major internal compartments that can be independently accessed by the user of the case.

SUMMARY OF THE INVENTION

According to the present invention, a wheeled carry-on case includes a rigid base that provides a rigid support. Mounted to the case is a guide in which a retractable handle is slidably received. Optionally, the remaining side walls of the case also can be, formed of a substantially rigid material to provide a case having what is commonly known as a "hard" frame. Alternatively, the side walls of the case may be formed of a non-rigid fabric.

The major longitudinal edge of the base is provided with two ground-engaging wheels. At least one of the minor longitudinal edges of the base is provided with two ground-engaging wheels.

The open side faces of the frame each are closed by a panel of fabric material. At least one of the open face panels is detachably attachable to the frame by conventional zippers. Where both sides are detachably secured by zippers, a rigid central partition is provided within the case, thus providing two separate compartments that are separately accessible by the user, thus representing a great convenience to the user.

Optionally, the retractable handle of the case can be rotated through 90° in order to facilitate forwards or sideways movement of the case.

In this manner, the case can be moved forwardly on the ground-engaging wheels by pulling forwards on the handle in order to tilt the case onto the ground-engaging wheels, or, the case can be moved sideways by similarly tilting the case to bring the ground-engaging wheels at the minor dimension of the base into contact with the ground surface, tilting of the case in that direction resulting in the ground-engaging wheels at the major dimension of the base being lifted off the ground surface, as are the wheels which may be present on the minor dimension of the base at the opposite side of the case.

Either or both side panels of the case can be provided with external pouches.

DESCRIPTION OF THE DRAWINGS

The invention will now be described with reference to the accompanying drawings, in which.

DESCRIPTION OF THE PREFERRED EMBODIMENTS

Figure 1:
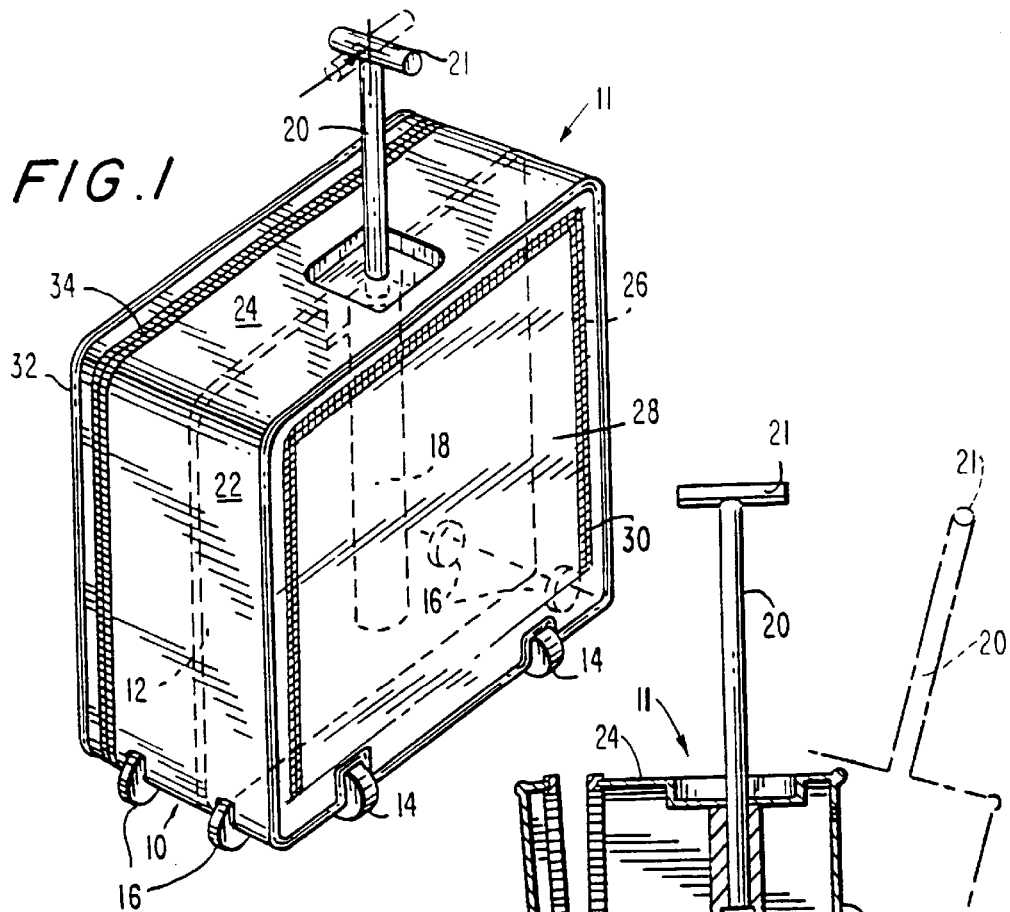
FIG. 1 is a perspective view of one embodiment of a wheeled carry-on case.
Figure 2:
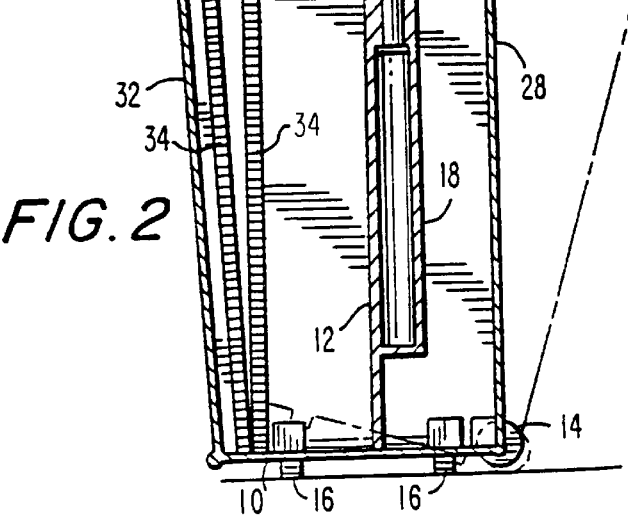
FIG. 2 is a cross-section through the case taken on the line 2—2, in FIG. 1; and, FIG. 3 is a plan view of an alternative form of the towing handle illustrated in FIGS. 1 and 2.

Referring first to FIGS. 1 and 2, the wheeled carry-on case 11 of this embodiment includes a base 10 formed from a substantially rigid material, and a partition 12, of a substantially rigid material that extends perpendicular to the base in the direction of the length of the base, i.e., the major dimension of the base, and provides two major compartments with the case.

Wheels 14 are journaled on the base at spaced positions along one of the major dimensions of the base. Wheels 16 are journaled on the base at spaced positions along both of the minor dimensions of the base.

Figures 4, 5:
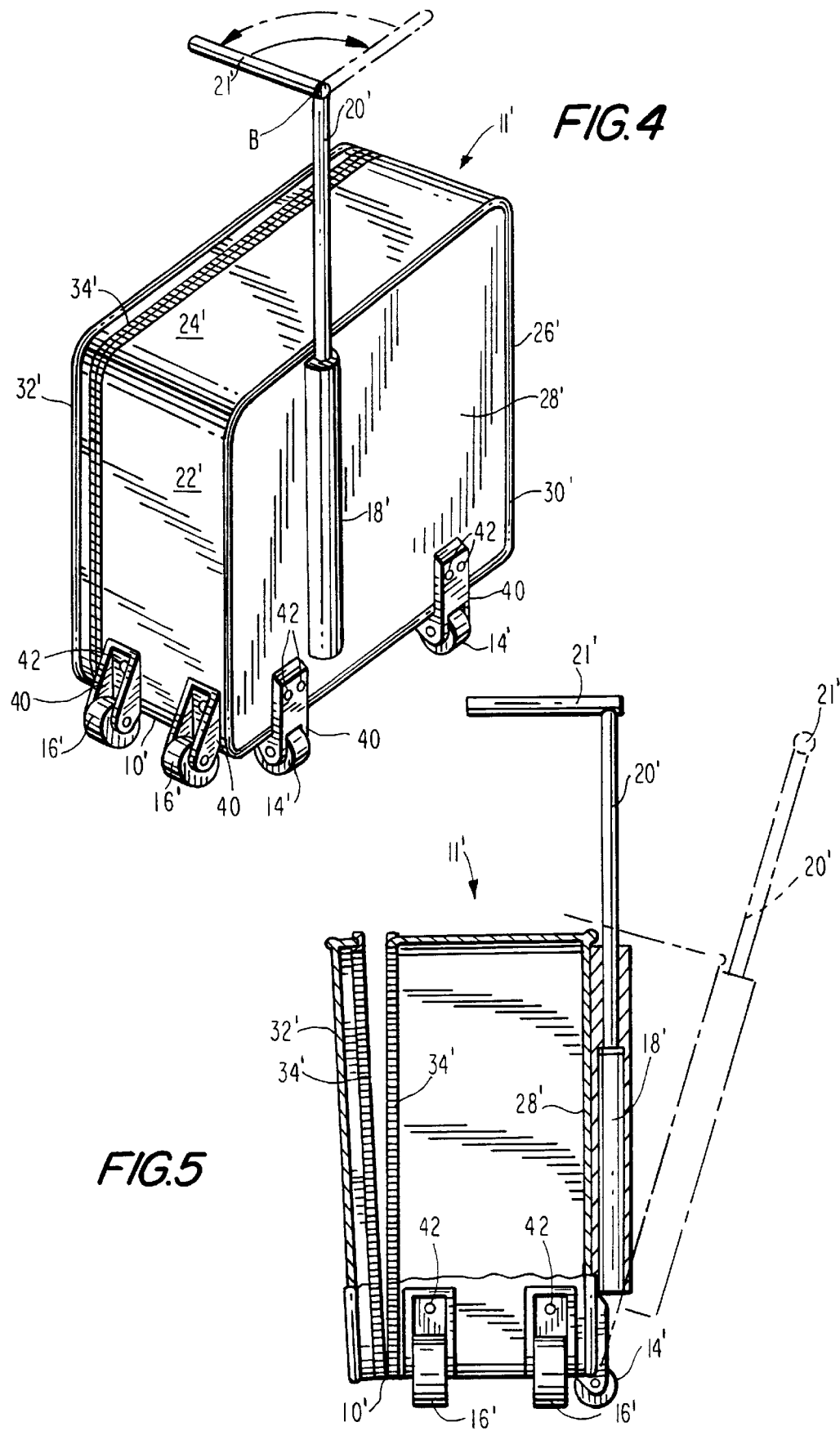
FIG. 4 is a perspective view of an alternative embodiment of the wheeled carry-on case.
FIG. 5 is a cross sectional through the case of FIG. 4, taken on the line B—B.
Figure 6:
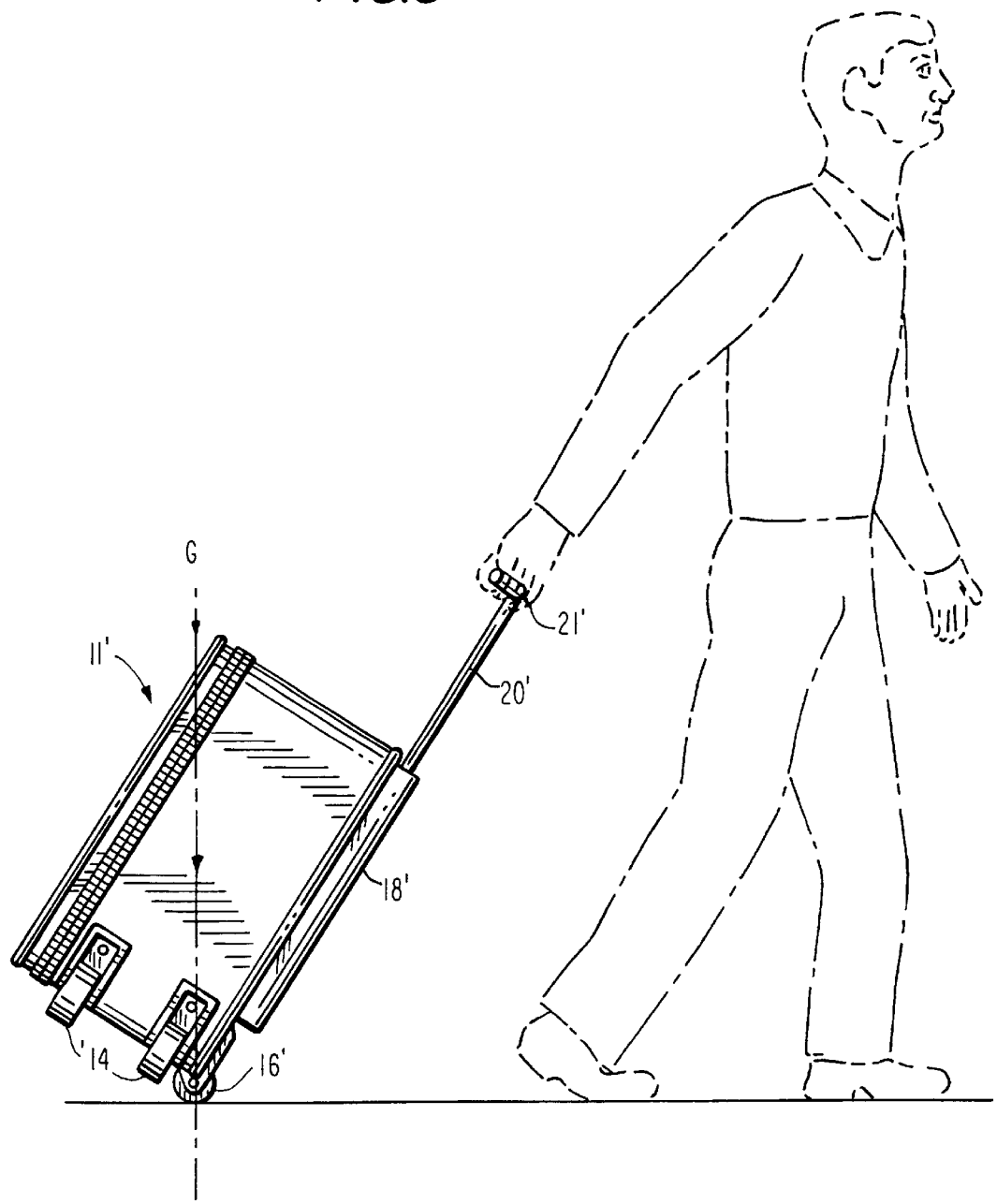
FIG. 6 shows the case of FIGS. 4 and 5 being moved along the wheels at its minor dimension.

A guide tube 18 is rigidly secured to the central partition 12, and, a retractable handle 20 is slidedly received within the guide tube 18, any suitable means being provided for limiting the extent to which the retractable handle can be withdrawn from the guide tube 18. Although shown centrally located along the partition 12, the guide tube may be placed off-center, as generally shown in the embodiment of FIGS. 4–6.

The remaining side walls 22–26 can be of any convenient construction, i.e., they can be formed from flexible fabric material, but preferably, and in order to provide stability to the partition 12, they are formed as substantially rigid members, thus to provide a substantially rigid perimeter to the case.

One side of the case is closed by a selectively removable wall 28 that is attached to the body of the case by a zipper 30.

The opposite wall 32, similarly is attached to the body of the case by a zipper 34.

In use of the case, when the user desires to move the case forwardly over a ground surface in a direction perpendicular to the front wall 28, the user merely extends the handle 20 out of the guide 18, and the angles the case for its weight to be positioned over the wheels 14.

If, now, the user must move the case laterally in order to negotiate an aisle in an aircraft or other narrow space, the user then extends the handle 20, rotates the manually graspable portion 21 90° and tilts the case in the direction of one of the pairs of wheels 16 to engage that pair of wheels with the ground surface. The user can then either push or pull the case laterally along the aislesway.

Preferably the handle 20 can be rotated within the guide 18 between two positions spaced 90° from each other, whereby the single retractable handle 20 is operably carried by the case to either present handle portion 21 as parallel to the front wall 28 and longitudinally of the side wall 24, or, the handle portion 21 can then be rotated for it to extend perpendicular to the side wall 28.

As is common in the art, side pouches (not shown) can be provided on either of the front wall and opposite wall 28 and 32, this providing an increased capacity of the case of the invention over commonly known cases.

Conveniently, the bottom wall 10 and the side walls 22–26 can be formed integrally with each other as a shell of the case, subsequent to which the partition 12 is rigidly attached to each of the base 10 and side walls 22–26, thus to provide an I-beam construction of the case presenting considerable strength and rigidity.

Figure 3:
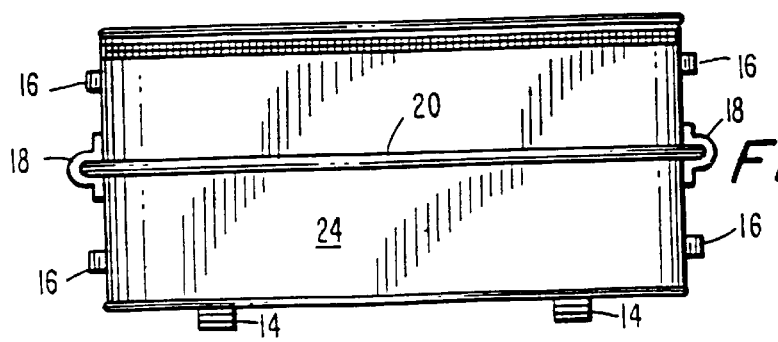

While a single tubular guide has been shown in the drawings, equally well dual tubular guides 18 can be provided as shown in FIG. 3, in order to accommodate an extendable handle of U-shape. In that instance, the guides 18 do not need to be positioned interiorly of the case, but, instead can be positioned exteriorly of the case as indicated in FIG. 3, this further increasing the carrying capacity of the case.

Reference is now made to FIGS. 4 and 5 which show a modification of the embodiment shown in FIGS. 1 and 2, and in which corresponding parts are indicated by the same numeral with a "prime" (') designation. The wheeled carry-on case 11' has a pair of wheels 14' spaced along its major dimension, and a pair of wheels 16' positioned along its minor dimension. These wheels are preferably mounted to the base region of the case by edge bracket members 40 secured to the case by rivets 42 and depending therefrom. Such mounting of the wheels on external brackets advantageously serves to enhance the structural integrity of the case. If desired, a second set of wheels 16' (not shown) may be mounted along the minor dimension edge at the opposed side of the base.

Guide tube 18' for the operating handle 20' is shown as secured to the rear panel 28' preferably by an appropriate support member internal of the case. This embodiment panel 28' is not openable (as shown by panel 28 in the embodiment of FIGS. 1 and 2) and the case will not be separated into two compartments, as shown by the partition 12 of FIGS. 1 and 2.

Handle mounting tube 18' is preferably located off-center of the rear panel 28', optimally about one-third of the distance between side walls 22' and 26'. Referring to FIG. 6, when the case 11' is tilted back to ride on the wheels 16' along the minor dimension, the center of gravity G of the case will be more to the center of the case over the wheels as the handle is pulled, than if the handle were centrally positioned between walls 22', 26'. Hence, this positioning of the handle will improve the balance of the case, thereby reducing the downward or upward force as sensed by the user's hand, to ease the pulling of the case as it is moved by wheels 16'. This will also advantageously tend to have the case further back from the user's feet, thereby minimizing the possibility of the case striking the user's feet.

Further constructional details will present themselves to persons skilled in the art. For example, the rear panel-mounted handle (of the embodiment shown in FIGS. 4–6) can be located within a pair of spaced tubular guides, as generally shown in FIG. 3. However, such tubular guides should still preferably be spaced so that the handle will be off center. Further, the handle of FIGS. 4–6, whether it includes a singular tubular guide 18' or a pair of such guides, can be mounted to the interior surface of the rear panel, and extend upward through openings provided along top wall 24'.

What is claimed is:

1. A wheeled case, including:

a substantially rectangular and substantially rigid base member having side edges comprising a major dimension of said base member, and having other side edges comprising a minor dimension of said base member;

a first pair of wheels operably mounted on said base member on axes parallel to said major dimension, at spaced positions along said major dimension of said base member at one side edge thereof, and a second pair of wheels operably mounted on said base member on axes parallel to said minor dimension, at spaced positions along at least one of the side edges of said minor dimension of said base member, whereby said wheeled case may be selectively moved by said first pair of wheels in a first direction perpendicular to said major dimension of said base member when said first pair of wheels are engaged and by said second pair of wheels in a second direction perpendicular to said minor dimension of said base member when said second pair of wheels are engaged;

said case including front, rear and a pair of side walls, each connected at one end to said base member; a top wall connected to the other end of said front, rear and side walls, a closure means along at least one of said walls to define an openable article receiving enclosure;

a guide rigidly secured to the case at a predetermined location and extending upwardly relative to said base member;

a single retractable handle having a free end extending outward of said top wall, and including a manually graspable portion at said free end, slidably received within said guide for selective movement between a retracted position in which said free end is at said top wall and an extended position in which said free end is substantially above said top wall;

said predetermined location operatively positioning said single retractable handle to place a substantial portion of the weight of the case over said second pair of wheels, to thereby guide movement of said case in a balanced condition in said second direction when said single retractable handle is moved to its extended position, whereby the location of said single retractable handle facilitates balanced manual moving of the case.

2. The wheeled case of claim 1, including means for rotably mounting said retractable operating handle to said case at said predetermined location, such that said manually graspable portion may be rotated between first and second conditions; said first condition adapted to guide movement of the wheeled case by said first of wheels, and said second condition adapted to guide movement of the wheeled case by said second pair of wheels.

3. The wheeled case of claim 2 wherein:

said retractable handle includes a rod portion extending downward from said manually graspable portion into said guide;

said rod portion operatively configured relative to said guide to permit rotation of said rod portion within said guide between said first and second conditions.

4. The wheeled case of claim 2, wherein said first and second conditions are orthogonally separated.

5. The wheeled case of claim 4, wherein said guide is located off-center between said side walls.

6. The wheeled case of claim 1, wherein said guide extends along said rear wall.

7. The wheeled case of claim 6, wherein said guide is located off-center between said side walls.

8. The wheeled case of claim 4, wherein said guide is located off-center between said side walls.

9. The wheeled case of claim 1, wherein at least one of said first or second pair of wheels is mounted to edge brackets depending from said base member.

10. The wheeled case of claim 1, wherein both of said first and second pair of wheels are mounted to edge brackets depending from said base member.

* * * * *